July 30, 1968   M. SHOELD   3,395,044
LEAD ACID STORAGE BATTERY OF THE JELLY-ROLL TYPE
Filed Sept. 21, 1967   2 Sheets-Sheet 2

INVENTOR
MARK SHOELD
BY Young & Thompson
ATTORNEYS

3,395,044
LEAD ACID STORAGE BATTERY OF THE JELLY-ROLL TYPE
Mark Shoeld, 2140 E. Graves Ave.,
Orange City, Fla. 32763
Filed Sept. 21, 1967, Ser. No. 669,599
5 Claims. (Cl. 136—13)

ABSTRACT OF THE DISCLOSURE

A lead acid storage battery of the jelly-roll type is mass produced by rolling up a plurality of strips of paper-like porous insulating material with lead foils between them and electrode material between the lead foils and the paper-like strips. One foil is part of the positive electrode and extends edgewise beyond the paper-like strips in one direction, while the other foil is part of the negative electrode and extends edgewise beyond the paper-like strips in the other direction. Lead wool electrically interconnects the edges of each foil at each end of the roll, with lead terminal plates on the outer sides of the wool and plastic plates on the outer sides of the terminal plates, the assembly being held together axially by plastic bolts and nuts.

---

The present invention relates to storage batteries having spiral electrodes of the loose-paste type, more particularly of the lead-acid type such as described and illustrated in my copending application Ser. No. 637,219, filed May 9, 1967, and to methods for their mass production. Preferred embodiments are illustrated in the accompanying drawings, in which.

Figure 1:
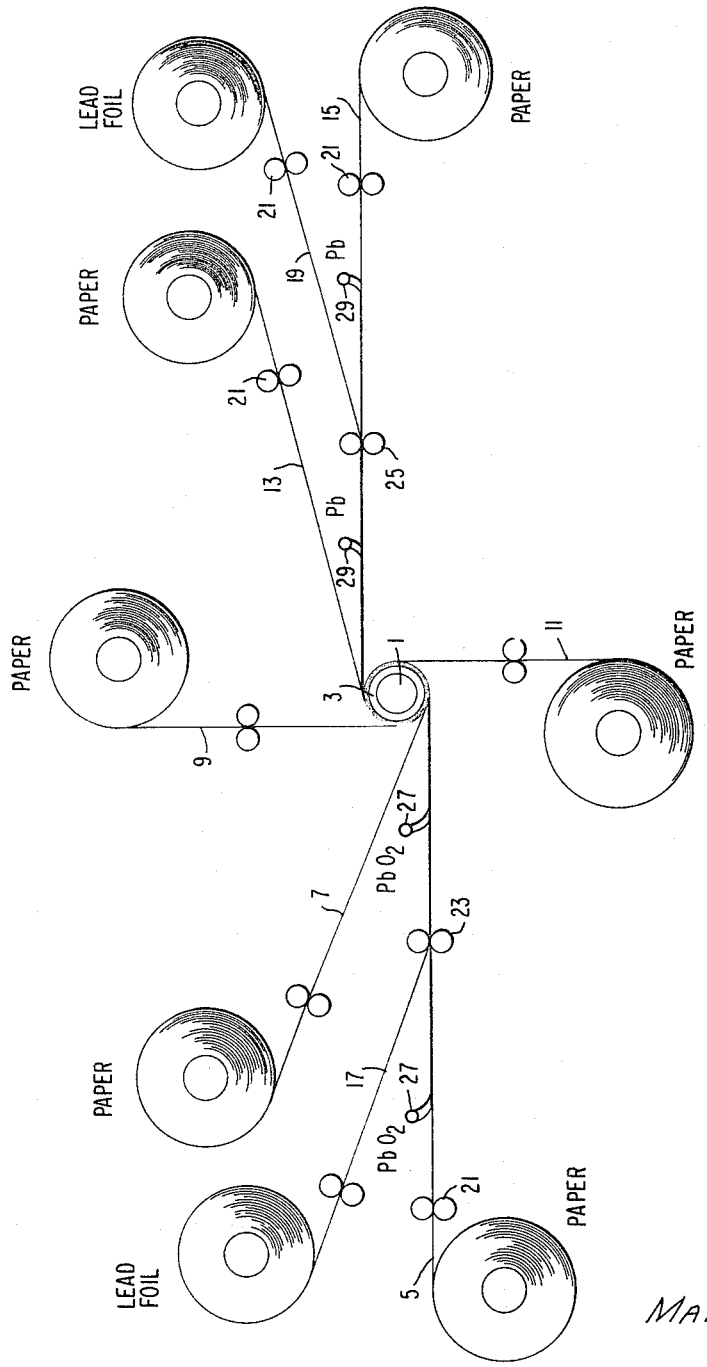
FIGURE 1 is a diagrammatic view of the apparatus for assembling the elements of a storage battery according to the present invention, illustrating schematically the present method.

Referring now to the drawings in greater detail, there is shown apparatus for mass producing lead-acid storage batteries according to the present invention, comprising a rotatable expansible spindle 1 of conventional construction, adapted to receive and releasably grasp thereon an elongated cardboard, plastic or other type of tube 3 which provides a core or mandrel for the formation of the battery. Tube 3 may, for example, have a length of twelve inches and an outer diameter of about an inch and be of the conventional rigid pasteboard type. When placed on spindle 1 as in FIG. 3 and the spindle expanded, the tube 3 is rotatable with the spindle; but when the segments of spindle 1 are collapsed, then tube 3 with or without a formed battery thereon can easily be slid on or off of spindle 1.

A plurality of webs of paper or paper-like porous insulating material 5, 6, 9, 11, 13 and 15, of the type described in my above-identified copending application, such as high wet strength kraft paper, are wound upon tube 3, with lead foils 17 and 19 between them. The paper-like webs and the lead foils are supplied from relatively large rolls of the same, which are power driven to unwind. As in my above-identified copending application, lead foil 17 is a positive plate-forming foil and projects edgewise outwardly beyond its associated paper-like webs or strips a short distance in one axial direction; while lead foil 19 is the negative-forming electrode and projects edgewise outwardly beyond its associated paper-like webs a short distance in the opposite axial direction.

Feed rolls 21 are provided for regulating the speed and position of the webs of paper-like material and the lead foils. Each web or lead foil is provided with at least one such set of feed rolls. The showing of FIG. 1 is entirely diagrammatic, however, and does not purport to represent the actual path of the webs and the foils nor the actual number of feed and idler rolls. Suffice it to say that rolls 21 are driven at constant angular velocity and are all of the same size, so that the feed of the paper-like webs and the lead foils is at constant linear velocity for all of them. But as the diameter of the rolls from which the paper and lead are fed decreases during feeding, and as the diameter of the sandwich that is building on mandrel 3 increases, it is obvious that the supply rolls and the spindle 1 must be driven at angular velocities that continuously vary. To this end, any of the conventional means for winding superposed webs at uniform velocity may be employed, such as a constant torque drive for spindle 1 that drives mandrel 3 at variable angular velocity dependent only on the tension in the webs and foils, and a variable velocity drive for the supply rolls that is controlled by a photoelectrically sensed position of a suspended bight of paper-like web or lead foil between the supply roll and the feed rolls 21.

The lead foil 17 is pressed against its underlying paper-like web 5 by means of a pair of pinch rolls 23; while the lead foil 19 is pressed against its underlying paper-like web 15 by a pair of pinch rolls 25.

Figure 2:
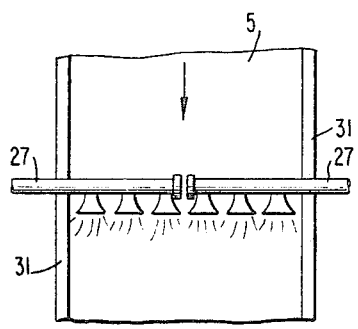
FIGURE 2 is an enlarged fragmentary top plan view of a strip of paper-like material receiving fluent electrode material.

Upstream of pinch rolls 23, with regard to the direction of web travel, a pair of applicator pipes 27 disposed above web 5 as shown in FIG. 2 applies a paste of lead peroxide containing 30% by weight of water, balance lead peroxide, to the upper surface of web 5. This lead peroxide paste is then rolled out between web 5 and foil 17 by pinch rolls 23 to a depth of about 0.006″. On top of foil 17, downstream of pinch rolls 23, another set of applicator pipes 27 adds the same quantity of the same lead peroxide paste to the upper surface of lead foil 17, which is then rolled out to the same depth between foil 17 and paper web 7 upon passage about mandrel 3.

As shown at the right of FIG. 1, colloidal lead paste of conventional composition and about 30% by weight water content is applied upstream of pinch rolls 25 by a pair of applicator pipes 29 to the lower paper-like web 15, which is then pressed out between pinch rolls 25 to the same depth as before; while downstream of pinch rolls 25, a further pair of applicator pipes 29 applies further colloidal lead paste to the upper surface of lead foil 19, the paper-like web 13 being then pressed down upon passage about mandrel 3.

A paper-like web 9 of porous insulating material thus is disposed between the webs 7 and 13 in the completed rolls; while a similar web 11 is disposed between the webs 5 and 15. As in the copending application, these webs may have, for example, a thickness of 0.008″ and a porosity of approximately 60% and weigh ¼ ounce per square foot dry, and be acidproof and of high wet strength by virtue of the inclusion of rubber latex in their manufacture. The lead foils, as in the copending application, may, for example, be 0.002″ thick. Webs 9 and 11 serve as separators between the composite positive and negative electrode assemblies.

As best seen in FIG. 2, the paper webs have thickened or raised edges 31, which as explained in the copending application serve as edgewise outward retainers for the colloidal lead and lead peroxide pastes. These raised edges 31 may be formed in any desired manner, for example, integrally with the material of the web during manufacture, or as applied strips held on by pressure-sensitive or other adhesive, or by folding over an edge of the web. They are preferably about ½" wide or less.

Care is taken that the paper webs and lead foils do not become laterally misaligned during winding. To this end, any of the conventional means for maintaining the proper lateral position of a strip or web may be used. For example, edge feelers can be used, or Askania roll units (not shown) of conventional construction can be employed in connection with or independently of the drive rolls 21.

Figure 3:
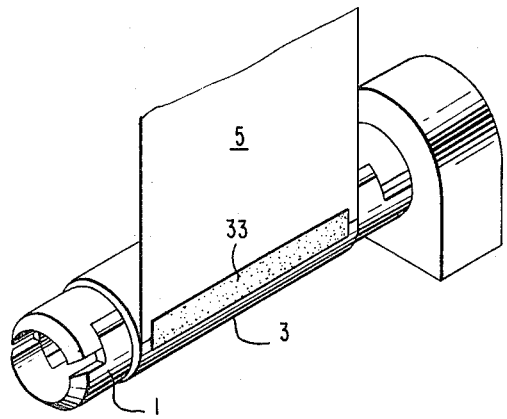
FIGURE 3 is a perspective view of the expansible mandrel with components of the battery thereon in the position they occupy at the beginning of the formation of a battery electrode unit according to the invention.

In starting the windup operation, the tube 3 is slipped on spindle 1, which is then expanded to grip the tube. The ends of the webs 5 and 15 are then fastened to tube 3 with adhesive tape 33 as best seen in FIG. 3. The ends of the webs 7, 9, 11 and 13 are also similarly attached, either to the tube 3 or to the webs 5 and 15. The machine is then started for a run of a short predetermined distance, approximately two or three wraps and is then stopped. The lead foils 17 and 19 are then adhesively taped onto the webs 5 and 15, respectively, and the machine is then started again, as well as the measuring pumps (not shown) by which the pastes are supplied to the applicator pipes 27 and 29. After predetermined lengths of paper web and lead foil with the pastes have been fed off and wound on the tube 3, the machine is stopped and the lead foils are cut off. The machine is then restarted with the paper-like webs only, for about two wraps. The webs are then cut off close to the roll and taped to the roll. After this, a thin polyethylene sheet of about .001" thickness or less is wrapped around the roll and fastened with small pieces of adhesive tape to improve the scuff resistance during handling.

Figure 4:
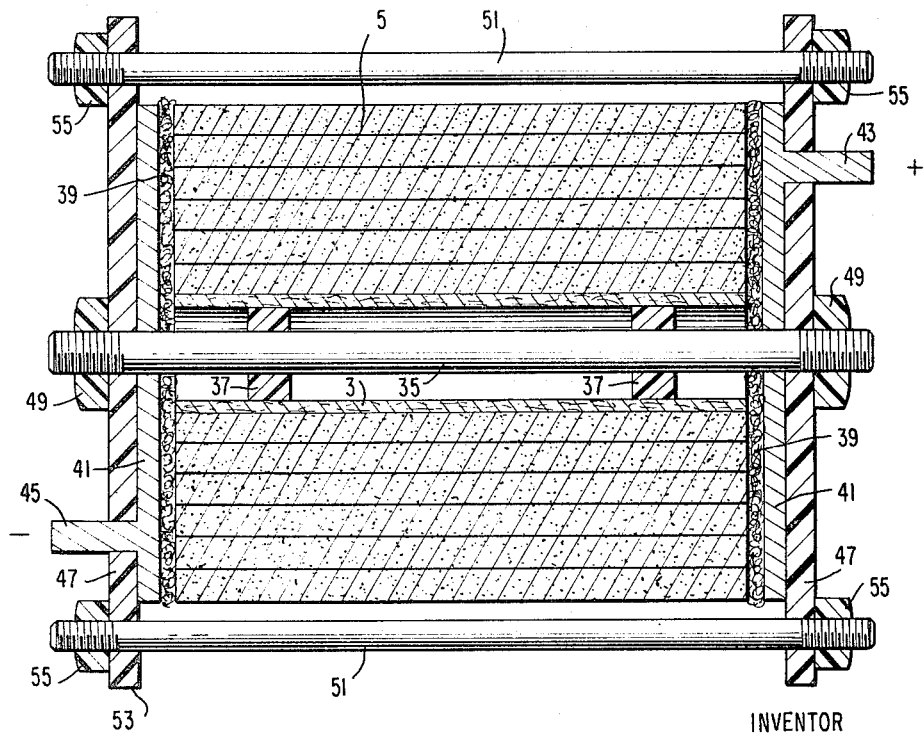
FIGURE 4 is a cross-sectional view of a completed battery according to the invention.

Expansible spindle 1 is collapsed and the completed roll is slipped off the mandrel. A plastic bolt 35 is then positioned centrally within the tube 3, and is centered therein by means of annular plastic spacers 37, as best seen in FIG. 4. Discs of lead wool 29 are then placed against each end of the roll, so that a portion of the lead wool contacts each turn of each foil. Of course, one foil will thus be in electrical connection with one disc of lead wool but not with the other; while the other foil will be in electrical connection with the other disc of lead wool but not with the first-mentioned disc. Perforated lead plates 41 are then slipped over the ends of plastic bolt 35 and pressed against lead wool 39. One of the plates 41 in electrical contact through the lead wool with the positive electrode has a lug 43 providing a positive terminal while the other lead plate 41 in electrical contact with the negative electrode has a lug 45 providing the negative terminal. Perforated plastic plates 47 are then slipped over the ends of bolt 35 and lugs 43 and 45, and plastic nuts 49 are applied on the opposite screw-threaded ends of bolt 35.

Plastic bolts 51 parallel to plastic bolt 35 also surround the roll and pass through ears 53 formed integrally on plastic plates 47. Nuts 55 are tightened on bolts 51 against ears 53.

To add the electrolyte, a plurality of the rolls are disposed with their axes horizontal in a leadlined vacuum tank. A nearly complete vacuum is then produced, and sulfuric acid of 53° Baumé is introduced. The pore spaces of the kraft paper or other material are thus filled; and with the water in the paste, an acid electrolyte of 1.28 specific gravity is achieved, which is desirable for the fully charged battery. On discharge, the acid strength goes down to about 1.20 specific gravity. The vacuum is released when the rolls are fully covered with acid. The acid is then drained from the tank and the units removed and tested.

If upon testing the rolls are found to be defective in any way, then the plastic components are removed and the roll is reclaimed as described in my copending application Ser. No. 654,739, filed July 20, 1967. But if the units are satisfactory, then they can be incorporated in a plastic casing with a plastic top, as in my copending application Ser. No. 637,219. The plastic parts can be reused indefinitely; and by use of an economical recovery system as indicated above, the cost of the battery over its useful life is very small.

Although the present invention has been described and illustrated in connection with preferred embodiments, it is to be understood that modifications and variations may be resorted to without departing from the spirit of the invention as those skilled in this art will readily understand. Such modifications and variations are considered to be within the purview and scope of the present invention as defined by the appended claims.

Having described my invention, I claim:

1. A lead-acid storage battery comprising a plurality of superposed layers including a pair of lead foils, a first layer of active material against one of the lead foils, a second layer of active material against the other of the lead foils, said lead foils and layers being rolled up in a spiral, at least one layer of insulating material separating said first and second layers of active material from each other and separating said first layer from said other lead foil and said second layer from said one foil, one said lead foil projecting beyond the active material and insulating material at one end of the spiral, the other said lead foil projecting beyond the active material and insulating material at the other end of the spiral, a lead plate at each end of the spiral, a layer of lead wool in compression between the lead plate and the projecting ends of a said lead foil at each end of the spiral, and terminals for the battery connected one to each of said lead plates.

2. A storage battery as claimed in claim 1, and insulating means bearing against opposite outer sides of said lead plates to retain the latter in assembled condition and the lead wool under compression.

3. A storage battery as claimed in claim 2, said insulating means comprising plastic plates disposed one on the outer side of each said lead plate, and insulating means rigidly interconnecting said plastic plates.

4. A storage battery as claimed in claim 3, said spiral being rolled up on a tube of insulating material, said interconnecting means comprising an elongated plastic member extending axially through said tube and screw-threaded at at least one end, and screw-threaded fastener means engageable with said at least one end of said elongated member to force said plastic plates toward each other.

5. A storage battery as claimed in claim 4, and a plurality of rods of insulating material encompassing said spiral and parallel to the axis of the spiral and interconnecting peripheral portions of said plastic plates.

References Cited

UNITED STATES PATENTS

| 2,487,499 | 11/1949 | Webb | 136—13 |
| 3,083,249 | 3/1963 | Belove | 136—13 |
| 3,141,795 | 7/1964 | Eisler | 136—26 |

WINSTON A. DOUGLAS, *Primary Examiner.*

A. SKAPARS, *Assistant Examiner.*